(12) United States Patent
Ludescher

(10) Patent No.: US 6,702,152 B1
(45) Date of Patent: Mar. 9, 2004

(54) DOSING CONTROL FOR HELICAL DOSING EQUIPMENT

(75) Inventor: Stefan Ludescher, Oftringen (CH)

(73) Assignee: K-Tron Technologies, Inc., Wilmington, DE (US)

( * ) Notice: Subject to any disclaimer, the term of this patent is extended or adjusted under 35 U.S.C. 154(b) by 36 days.

(21) Appl. No.: 10/018,471

(22) PCT Filed: Nov. 12, 2000

(86) PCT No.: PCT/CH00/00656
§ 371 (c)(1),
(2), (4) Date: Feb. 23, 2002

(87) PCT Pub. No.: WO01/48444
PCT Pub. Date: Jul. 5, 2001

(30) Foreign Application Priority Data

Apr. 1, 2000 (CH) .............................................. 633/00

(51) Int. Cl.⁷ .............................................. G01G 13/00
(52) U.S. Cl. ......................................... 222/77; 222/413
(58) Field of Search .............................. 222/55, 56, 58, 222/63, 77, 185.1, 413

(56) References Cited

U.S. PATENT DOCUMENTS

| | | | | |
|---|---|---|---|---|
| 4,272,824 A | * | 6/1981 | Lewinger et al. | 700/265 |
| 4,320,855 A | * | 3/1982 | Ricciardi et al. | 222/56 |
| 5,184,754 A | | 2/1993 | Hansen | 222/55 |
| 5,423,456 A | | 6/1995 | Arendonk et al. | 222/54 |
| 6,060,667 A | * | 5/2000 | Pollock | 177/121 |
| 6,168,305 B1 | * | 1/2001 | Marmsater | 700/240 |

FOREIGN PATENT DOCUMENTS

| | | |
|---|---|---|
| DE | 2903259 A1 | 7/1980 |
| GB | 1491034 A | 11/1977 |
| JP | 57028217 | 2/1982 |

OTHER PUBLICATIONS

"Schuttgutmechanische Auslegung von Dosierdifferential waagen mit Schneckenaustrag", G. Vetter et al., Wagen und Dosieren, DE, Verlagsgesellschaft, Keppler, Mainz, vo. 24, No. 4, Jul. 1, 1993, pp. 3–16.
International Search Report of PCT/CH00/00656 dated Mar. 14, 2001.

\* cited by examiner

Primary Examiner—Joseph A. Kaufman
(74) Attorney, Agent, or Firm—RatnerPrestia

(57) ABSTRACT

A device for the control of dosing of a time dependent mass flow $\dot{m}(t)$ for a helical dosing equipment (1) with a weighing machine (9) and a method of operation of such a device. The device includes a modulation detector (31), with which the periodic deviation of the mass flow $\dot{m}(t)$ from a target value can be analyzed. The modulation detector (31) is connected to a speed modulator (32), with which the rotational speed f of the extraction helix (4) can be suitably phase shift modulated according to the curve shape derived by the modulation detector (31), whereby the deviations of the mass flow $\dot{m}(t)$ are reduced to the unavoidable random deviations and the periodic deviation of the mass flow $\dot{m}(t)$ can be eliminated. Both for the analysis of the mass flow $\dot{m}(t)$ and also for the calculation of the modulation function analog or digital integrated electronic components can be applied. Individual or all of these calculations can however also be performed with the aid of a digital computer.

29 Claims, 4 Drawing Sheets

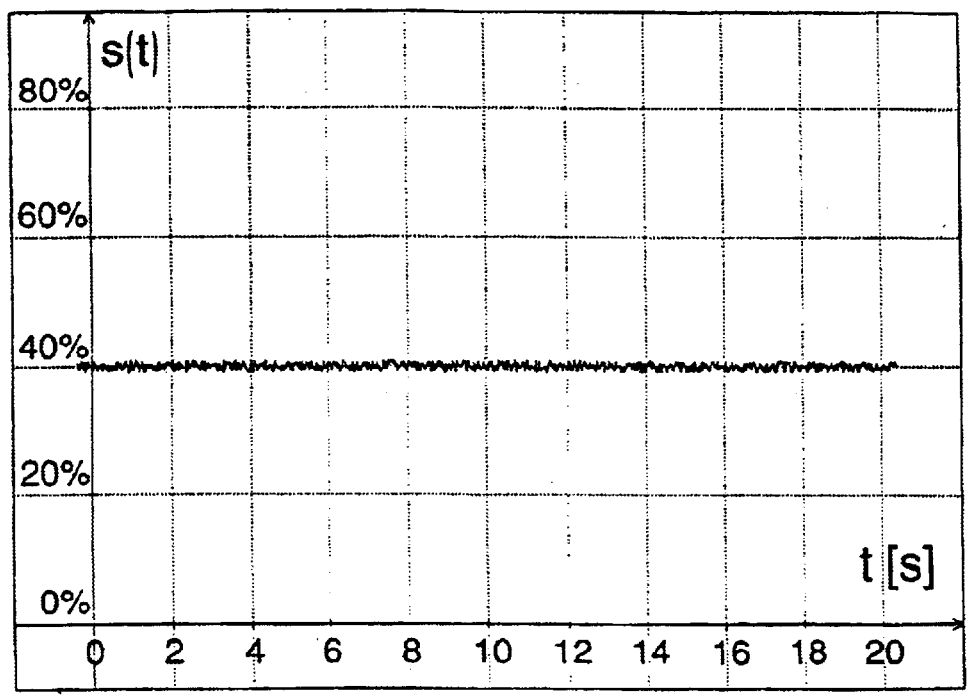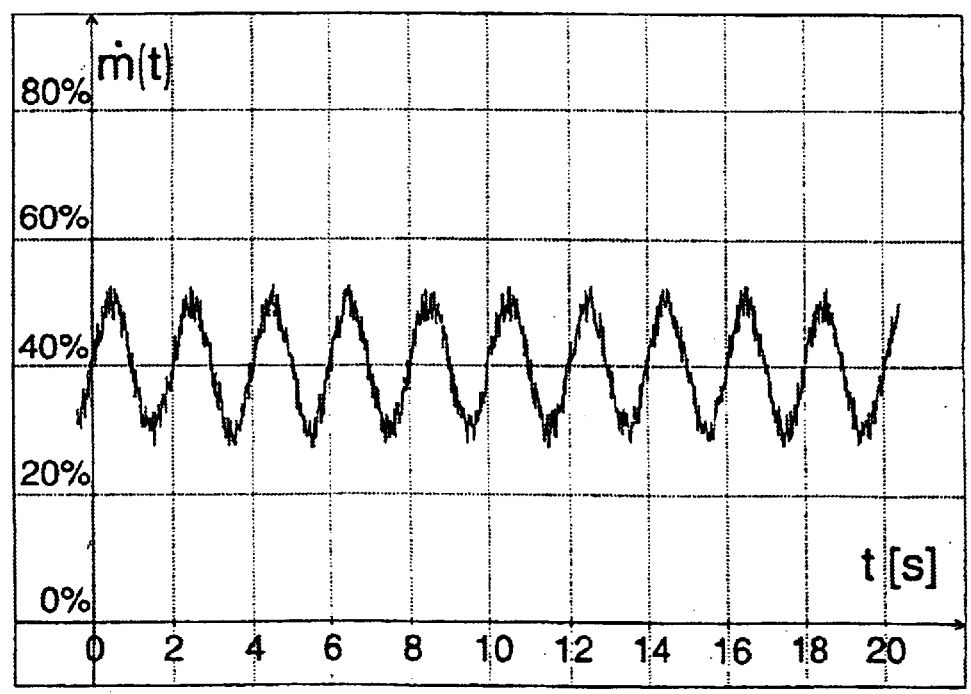
Fig. 2

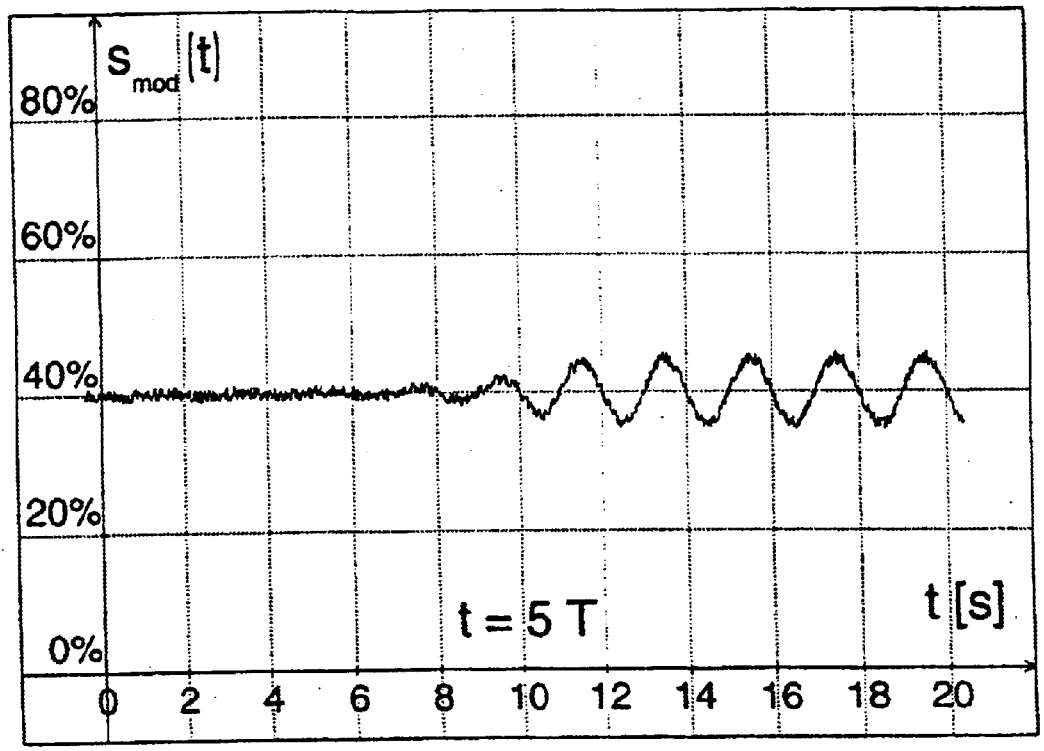
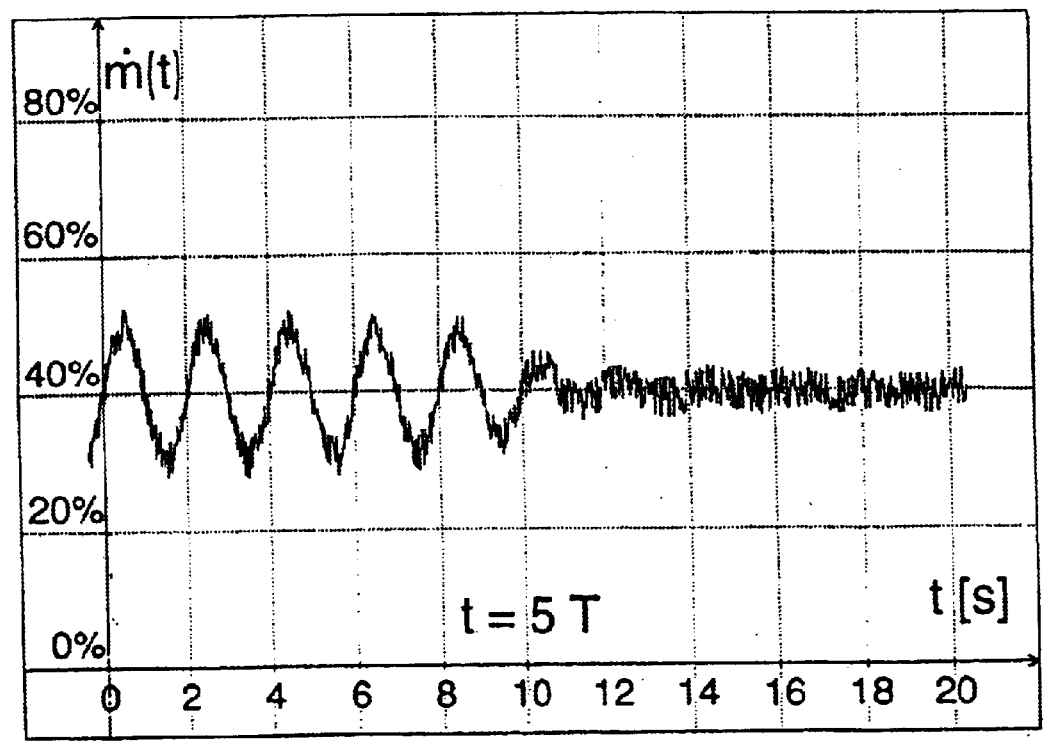
Fig. 6 ize*# DOSING CONTROL FOR HELICAL DOSING EQUIPMENT

TECHNICAL FIELD

The present invention relates, in general, to equipment for feeding bulk materials in metered amounts and, in particular, to the control of dosing of such equipment and to a method for the operation of such equipment.

In the conveying of bulk materials using an extraction helix, the volumetric dosing principle or the more precise gravimetric principle can be used. In the latter, the mass m(t) of an extraction equipment, a supply container and the bulk material present in it are weighed together, whereby the difference of mass per unit of time, namely the mass flow ṁ(t) dependent on the time t, is continuously detected electronically. The actual value is compared to a desired target value and regulated by a known dosing controller to the desired value.

In practice, the mass flow ṁ(t), dependent on the time t, is, however, not constant, but fluctuates periodically at a frequency which equals the speed of revolution of the extraction helix or is a whole harmonic of it. The dosing controller is generally not arranged to even out these periodic deviations from the desired constant value.

In addition, the difficulty exists that different extraction helices, and also different bulk materials, or the same bulk materials with slightly different or changing flow parameters, lead to completely other fluctuations of the mass flow ṁ(t).

The objective which is addressed by the present invention, is to provide a device for dosing control of helical dosing equipment as well as a method for the operation of such devices, which are immediately and always ready, and with which the above mentioned periodic fluctuations arising in the mass flow ṁ(t) of such devices can be essentially eliminated, independent of the characteristics of the extraction helix used and independent of the characteristics of different bulk materials.

SUMMARY OF THE INVENTION

In accordance with the present invention, bulk material, stored in a container, is received by a feeder, driven by a motor, and delivered, in metered amounts, to utilization equipment by the feeder. The actual mass flow rate of the bulk material delivered by the feeder to the utilization equipment is measured and the difference between the actual flow rate of the bulk material delivered to the utilization equipment and a desired flow rate of the bulk material delivered to the utilization equipment is determined. Periodic deviations of the actual mass flow rate of the bulk material delivered to the utilization equipment from the desired flow rate of the bulk material delivered to the utilization equipment are quantitatively analyzed and a modulation signal, representative of the quantitative analysis, is generated. The modulation signal is processed into a modulated position signal that controls the motor that drives the feeder to modulate the speed of the motor with the modulated position signal.

BRIEF DESCRIPTION OF THE DRAWINGS

The invention is further explained using the following Figures. Shown are.

DETAILED DESCRIPTION OF THE INVENTION

Figure 1:
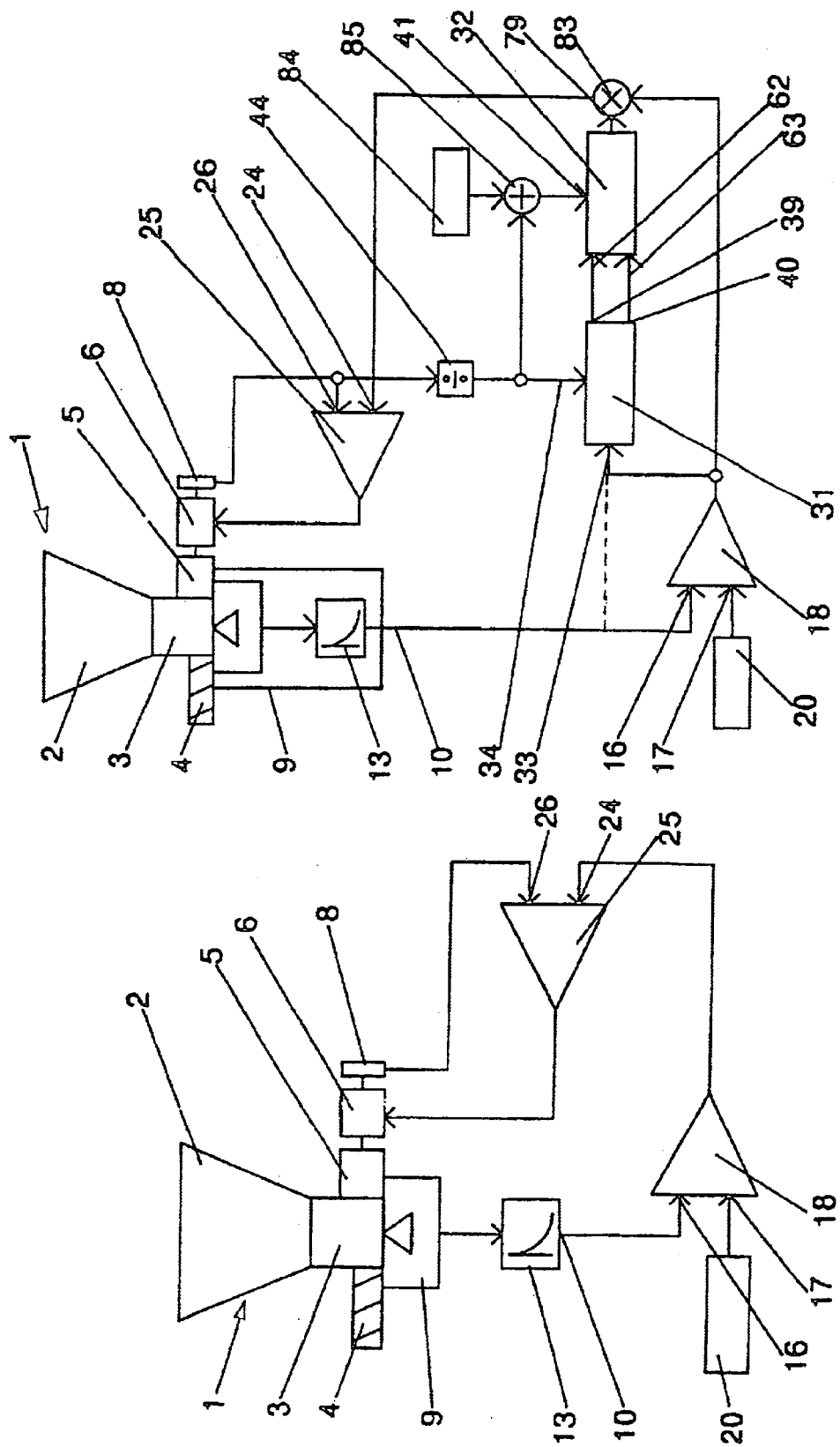
FIG. 1 which is the basic schematic diagram of a helical dosing equipment according to the known state of the technology, FIG. 2 which is a representation of a position signal s(t) to the speed regulator and the resultant mass flow ṁ(t) in a helical dosing equipment according to the known state of the technology, FIG. 3 which is the basic schematic diagram of a device according to the invention for dosing control for a helical dosing equipment with a modulation detector and a rotational speed modulator, FIG. 4 which is the block circuit diagram of a modulation detector according to the invention, FIG. 5 which is the block circuit diagram of a rotational speed modulator according to the invention, and FIG. 6 which is a representation of the modulated position signal $s_{mod}(t)$ and the resultant mass flow ṁ(t).

FIG. 1 shows the basic design of a helical dosing equipment 1 according to the known state of the technology. This equipment has a supply container 2 filled with bulk material, from which the bulk material falls via a guide 3 onto an extraction helix 4. This extraction helix 4 is, as a rule, connected via a gearbox 5 to an electric motor 6. Further, angle measuring means are present with which the angular position of the extraction helix 4 can be determined. Such means are known and include, for instance, coded discs or incremental transmitters which are connected to a suitable axle. Here, as an example, an incremental transmitter 8 is shown, which is connected to the axle of the electric motor 6. The whole helical dosing equipment 1 is positioned on an electronic weighing machine 9, which is known to those skilled in the art. The sum of the masses of the helical dosing equipment 1 and of the bulk material contained in this equipment is measured by the weighing machine 9. The corresponding weight signal is taken in a known manner to the input of an electronic differentiator 13. This has an output 10, which now gives out a signal, which corresponds to the mass flow ṁ(t). This output 10 is connected to the first input 16 of a mass flow controller 18. A target value transmitter 20 generates, at its output, a first target value signal. The output of target value transmitter 20 is connected to a second input 17 of the mass flow controller 18, which generates a position signal s(t) at its output, which is essentially corrected by the difference between the mass flow signal from the differentiator 13 and the signal from the target value transmitter 20. The output of the mass flow controller 18 is connected to a first input 24 of a rotational speed regulator 25. The incremental transmitter 8, identified above, generates a speed signal, which is applied to the second input 26 of the speed regulator 25. This generates a difference signal at the output of rotational speed regulator 25, which corresponds essentially to the difference between the position signal s(t) of the mass flow controller 18 and the speed signal of the incremental transmitter 8. The output of the speed regulator 25 is connected to the input of the electric motor 6, whereby the speed of rotation of the electric motor 6 is matched to the desired target value of the mass flow ṁ(t)

FIG. 2 shows the progress over time of the essentially constant position signal s(t) at the first input 24 of the speed regulator 25, and the progress over time of the mass flow ṁ(t) resulting from the position signal s(t) in a helical dosing equipment 1 according to the known state of the technology. The speed of the extraction helix 4, selected as an example, amounts here to a half turn per second, which gives a period duration T of two seconds. The position signal s(t) of the mass flow controller 18 has, in this example, a value of 40% of its maximum value. The resultant mass flow ṁ(t)—similarly given as a fraction of its maximum value—shows a periodic progress with a period T, which is overlaid by random, periodic interference. Experience shows the main part of the periodic interference to lie at the basic frequency f=2π/T. The contributions of the harmonics 2f, 3f, . . . are practically negligible. The mass flow ṁ(t) can, apart from random interference, be described mathematically as follows:

$$\dot{m}(t) = A + S1\sin(1\cdot 2\pi f \cdot t) + C1\cos(1\cdot 2\pi f \cdot t)$$
$$+ S2\sin(2\cdot 2\pi f \cdot t) + C2\cos(2\cdot 2\pi f \cdot t)$$
$$+ S3\sin(3\cdot 2\pi f \cdot t) + C3\cos(3\cdot 2\pi f \cdot t)$$
$$+ \ldots,$$

where A, S1, C1, S2, C2, . . . are constants, which fulfil the conditions $A^2 \gg S1^2 + C1^2 \gg S2^2 + C2^2 \gg \ldots$ . The sampling frequency of the weighing machine 9 is here always much greater than the rotational speed of the extraction helix 4.

FIG. 3 shows the basic diagram of a device, according to the invention, for the control of dosing for a helix dosing equipment 1. This device includes, as well as the means already described in connection with FIG. 1, a modulation detector 31 in addition, with which the periodic deviations of a characteristic signal for the mass flow ṁ(t) can be quantitatively analysed by a target value and a rotational speed modulator 32, with which a suitable modulation signal can be generated from the quantitative values found by the modulation detector 31, with which the position signal s(t), and thereby the speed of rotation of the extraction helix 4, is modulated corresponding to the curve shape of the mass flow ṁ(t) derived by the modulation detector 31. The modulation of the position signal s(t) occurs in a first processing element 83, which has a first and a second input: one input 79 from the rotational speed modulator 32, which carries the modulation signal, is connected to the first input of the processing element 83, the output of the mass flow controller 18, which carries the position signal s(t), is connected to the second input of the processing element 83. The two signals applied to the two inputs of processing element 83 are processed in a suitable manner, for instance by mixing or by simple multiplication, into a single signal smod(t). This signal smod(t) is present on an output of the processing element 83, which is connected to the input 24 of the rotational speed regulator 25.

Below is presented in each case one technical embodiment of a modulation detector 31 and a rotational speed modulator 32.

The modulation detector 31 has a first input 33, which is connected to the output of the mass flow controller 18, whereby this input is indirectly connected to the weighing machine 9, and a second input 34, which, as a rule via a divider element 44, is connected to the output of the angle measuring means, here, for instance, with the output of an incremental transmitter 8. In a modification, the first input 33 can be connected directly to the output 10 of the weighing machine 9, instead of indirectly via the mass flow controller 18, as is indicated by the dashed connecting line. The necessary modifications to the details of the circuit are familiar to one skilled in the art, for which reason it is unnecessary to go further into this here. At this first input 33 there is thus, in both cases, a signal which is characteristic of the mass flow ṁ(t), which includes information on the deviation from its target value of the mass flow ṁ(t), that is either the position signal s(t) of the mass flow controller 18 or the signal at the output 10 of the weighing machine 9, which is intended to be included under the concept of position signal s(t).

The modulation detector 31 has an output 39 and an output 40, which are connected, respectively, to corresponding inputs 62 and 63 of the rotational speed modulator 32. The rotational speed modulator 32 includes also a speed signal input 41. At this input 41, a signal is applied which is formed in a further processing element 85 from the signals of the divider element 44 and a known phase correction element 84, for instance, by mixing. In a very simple modification, this processing element 85 can be a simple addition element. The function of the phase correcting element 84 is treated further in the description of FIG. 5.

Figure 4:
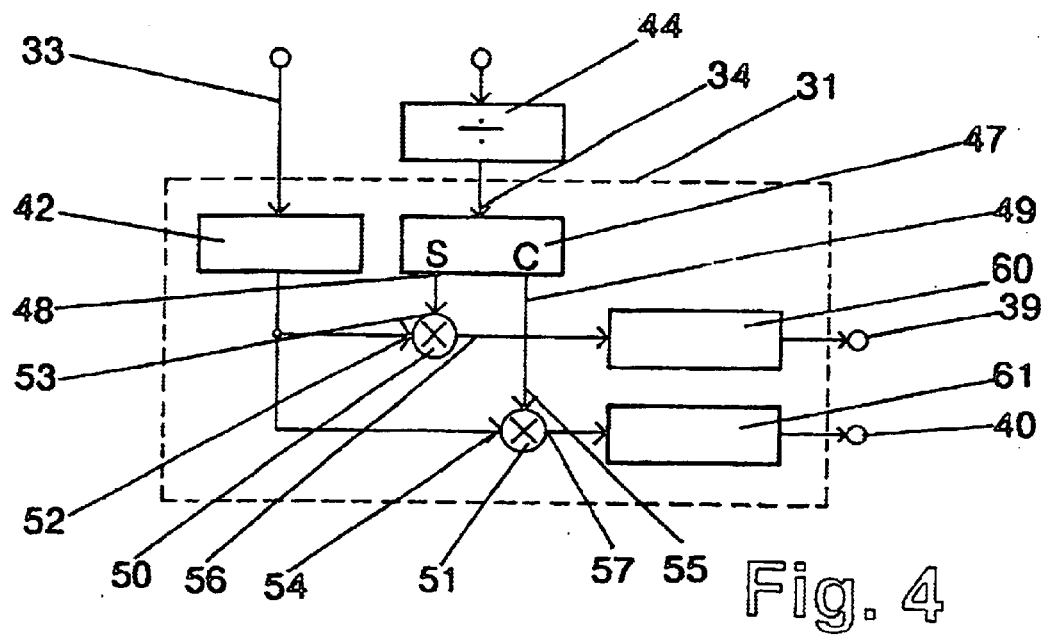

FIG. 4 shows the block circuit diagram of a modulation detector 31 according to the invention, with the use of an incremental transmitter 8 as the angle measuring means, which, as a rule, also makes necessary the application of a divider element 44. The characteristic signal for the mass flow mt(t), i.e., the position signal s(t) under which the signal at the output 10 of the weighing machine 9 is also understood, is applied to the first input 33 of the modulation detector 31. This position signal s(t) is first taken to an average value deviation element 42, which is known to one skilled in the art and with which the deviation of the mass flow ṁ(t) from its average value can be determined. The divider element 44 divides the signals from the incremental transmitter 8 applied to it by a suitable number, as a rule by the number of pulses from the incremental transmitter resulting per revolution of the extraction helix 4, and transmits this basic frequency f to a second input 34 of the modulation detector 31 as the rotational speed signal. The modulation detector 31 includes a first angle function generator 47, at whose input this rotational speed signal is applied. The angle function generator 47 has an S-output 48 and a C-output 49, at which essentially a sine signal and a cosine signal with the basic frequency f, respectively, are output. The modulation detector 31 further includes two multiplier elements 50, 51 which each have two factor inputs 52, 53, and 54, 55, respectively, and each has a product output 56 and 57, respectively. The first factor input 53 of the first multiplier element 50 is connected to the S-output 48 and the second factor input 52 of the first multiplier element 50 is connected to the output of the average value equalising element 42. The first factor input 55 of the second multiplier element 51 is connected, in a corresponding manner, to the C-output 49 and the second factor input 54 similarly is connected to the output of the average value equalising element 42. At the product output 56 of the first multiplier element 50, there appears essentially a product of the mass flow ṁ(t) and a sine function with period T, and, at the product output 57 of the second multiplier element 51, there appears essentially a product of the mass flow ṁ(t) and a cosine function with the same period T. Each of the product outputs 56, 57 is connected to one input of an integrator 60, 61, respectively, which integrate these signals over the time T and present the values of these integrals at their outputs 39, 40. At the output 39, there appears essentially the value of $$SI = \frac{1}{T}\int_0^T \dot{m}(t)\cdot \sin(2\pi f\cdot t)\,dt$$

and at output 40 there appears essentially the value of $$CI = \frac{1}{T}\int_0^T \dot{m}(t)\cdot \cos(2\pi f\cdot t)\,dt$$

i.e., the values of the two Fourier coefficients S1, C1 in the development of the periodic function ṁ(t) as the sum of a constant function and the sine and cosine functions of suitable amplitude and basic frequency f.

Figure 5:
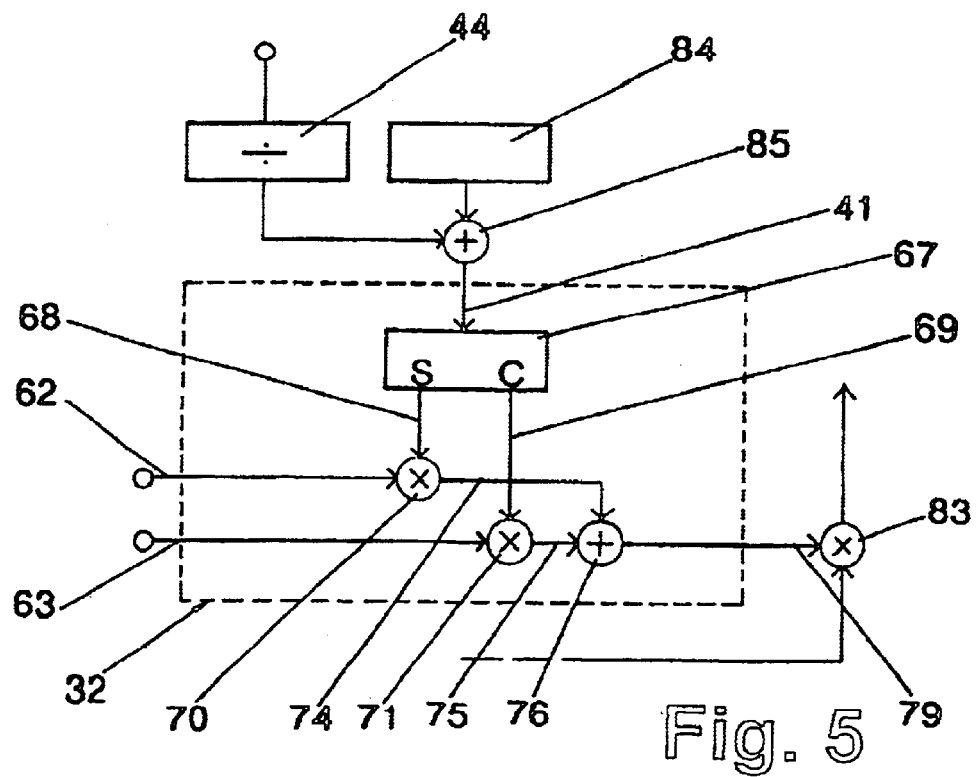

FIG. 5 shows the block circuit diagram of a rotational speed modulator 32 according to the invention, similarly adapted to the example of the use of an incremental transmitter 8 as the means of angle measurement. At the rotational speed signal input 41 of the rotational speed modulator 32 appears the output signal of the processing element 85, already set out in the description of FIG. 3. This speed signal input 41 is connected to the input of a second angle function generator 67. This has an S-output 68 and a C-output 69, at which essentially a sine signal and a cosine signal, respectively, with the basic frequency f are generated. With the aid of the already mentioned phase correcting element 84, the phase setting of the angle function given out by the angle function generator 67 can be additionally shifted at will, which can be useful owing to the delayed system response times. The rotational speed modulator 32 has two further inputs 62 and 63, which are joined to the outputs 39 and 40, respectively, of the already presented modulation detector 31. The rotational speed modulator 32 further includes two multiplying elements 70 and 71 which each have two factor inputs and one product output 74 and 75, respectively. Each of the inputs 62, 63 is connected with one of the two factor inputs of, in each case, one of these two multiplying elements 70 and 71, respectively, whilst the other factor inputs, in each case, are connected to the S-output 68 and the C-output 69, respectively, of the second angle function generator 67. In the first multiplying element 70, the product is formed of the signal at the S-output 68 and the signal at the output 39 of modulation detector 31. In the second multiplying element 71, the product is formed of the signal at the C-output 69 and the signal at the output 40 of the modulation detector 31. The rotational speed modulator 32 further includes an addition element 76, with which the signals at the product outputs 74, 75 can be added. These sums represent a matching phase shifted approximation function for the deviation from an average value of the mass flow ṁ(t). The output 79 of the addition element 76 is connected to one of the inputs of the processing element 83, as already set out in the description of FIG. 3. At the output of the processing element 83, there appears a signal from the mass flow controller 18 overlaid by a sine function of frequency f with matching amplitude and phase position, which can be taken to the first input 24 of the rotational speed regulator 25 as a modulated position signal smod(t).

FIG. 6 shows the progress over time of the modulated position signal smod(t) at the first input 24 of the rotational speed regulator 25 as well as the resulting mass flow ṁ(t) in a helical dosing equipment 1 according to the invention. The speed of rotation of the extraction helix 4 here amounts to a half turn per second as in the example in FIG. 2. The position signal s(t) has here, for instance, during time t<5T an essentially constant, typical value of 40% of its maximum value.

This results in the periodically fluctuating mass flow ṁ(t) already described under FIG. 2 which is similarly given as a fraction of its maximum value. At time t=5T, the phase shifted modulation of the position signal s(t) becomes effective at the first input 24 of the rotational speed regulator 25. The deviations of the mass flow ṁ(t) are reduced for t>5T to unavoidable random deviations, whilst the periodic part of the mass flow ṁ(t) for t>5T can be practically entirely eliminated.

With sufficient resolution over time of the mass flow ṁ(t) by the weighing machine 9, it is obviously possible, in accordance with the invention, that, in an analog manner, additional coefficients of the Fourier series, for instance, S2, C2; S3, C3; ... are determined and the speed of revolution modulated accordingly. This is familiar to one skilled in the art, so that a detailed description can be dispensed with here. The number of harmonics which can be evened out is limited by the sampling frequency of the weighing machine 9 and the known mathematical sampling theorem.

It is obviously also in accordance with the invention that individual or all the necessary mathematical operations can be performed by the application of one or more integrated analog circuit elements, by the application of one or more integrated digital circuit elements, or by the application of a programmable digital computer.

In other embodiments of the device according to the invention, on the one hand, special values only, for instance, the extreme values, of the mass flow ṁ(t) are determined by the modulation detector 31; on the other hand, any desired further modulation functions can be laid down and, instead of a sum of sine and cosine functions, comprise a suitable overlay of quadratic functions, in the simplest case, for instance, by the opening of lower and higher parabolic sections, whereby the device and the method, respectively, are simplified, periodic deviations of the mass flow ṁ(t) can nonetheless be satisfactorily eliminated.

It is similarly in accordance with the invention to combine this device with known means or with known methods, especially with calibration measurements performed at suitable time intervals over one or more periods T. This can, for instance, occur such that the procedure, according to the invention, for eliminating deviations with the basic frequency f, is employed, i.e., the periodic deviations of the mass flow ṁ(t) from a target value at the basic frequency f are analysed continuously with a modulation detector 31 and an approximation function calculated for these deviations, whilst the amplitudes of the deviations at higher frequencies 2f, 3f ... are determined by the last calibration measurement in each case. The speed of the extraction helix 4 is then modulated according to a combination of the calculated approximation function for the basic frequency f and the amplitudes for the deviations at higher frequencies, similarly using a rotational speed modulator 32 so that the deviations of the mass flow ṁ(t) are reduced to the unavoidable random deviations, and the periodic deviations of the mass flow ṁ(t) are eliminated.

What is claimed is:

1. A device for dosing control of the mass flow for a helical dosing equipment with a supply container for bulk material, an electric motor, an extraction helix coupled to the electric motor, angle measuring means for determining the angular position of the extraction helix, a weighing machine which continuously measures the weight of the helical dosing equipment together with the bulk material contained in the helical dosing equipment, a mass flow controller connected to an output of the weighing machine and a rotational speed regulator (25) connected to the motor (6), characterized in that a modulation detector is present and is connected to the angle measuring means, with which the periodic deviations of a characteristic signal from a target value can be analysed quantitatively, a rotational speed modulator is present and is connected to the angle measuring means and the modulation detector, with which a suitable modulation signal can be generated from the quantitative values found by the modulation detector, a processing element is present and is connected to the rotational speed modulator and the mass flow controller, with which this modulation signal and the characteristic signal for the mass flow m(t) can be processed into a modulated position signal, the rotational speed regulator is connected to an output of the processing element and with this modulated position signal can modulate the speed of revolution of the extraction helix according to the shape of the curve derived by the modulation detector.

2. A device according to claim 1, characterized in that the angle measuring means include an incremental transmitter joined to a suitable axle.

3. A device according to claim 2 characterized in that an output of the weighing machine is connected indirectly via the mass flow controller to the modulation detector, the characteristic signal for the mass flow is a position signal at the output of the mass flow controller.

4. A device according to claim 2 characterized in that an output of the weighing machine is connected directly to the modulation detector, the characteristic signal for the mass flow is a signal at the output of the weighing machine.

5. A device according to claim 4 characterized in that a divider element is present, the incremental transmitter is connected to this divider element, this divider element divides the frequency of a signal generated by the incremental transmitter by a suitable number, the incremental transmitter is connected indirectly via the divider element to the rotational speed modulator.

6. A device according to claim 5 characterized in that the modulation detector includes, suitably connected amongst each other means with which the periodic deviations from the average value of the mass flow from a target value can be determined, means for generating a sine and a cosine signal at the basic frequency, multiplication means with which the products of the mass flow and the sine signal, and of the mass flow and the cosine signal can be determined, means of integration, with which the average values in each case of these products can be determined over time.

7. A device according to claim 6, characterized in that in the modulation detector additional means are available for the generation of sine and cosine signals at a natural multiple of the basic frequency, additional means are available for the determination of the average values over time of the products of the mass flow and the these sine and cosine signals respectively.

8. A device according to claim 5 characterized in that the rotational speed modulator includes, suitably interconnected amongst each other means for the generation of one sine and one cosine signal respectively at the basic frequency, multiplication means with which these sine and cosine signals respectively can be multiplied with the corresponding output signals from the modulation detector, addition means, with which these products can be added into a sum, the rotational speed modulator has an output, at which essentially a modulation signal appears which corresponds to this above mentioned sum, this output is connected with an input of the processing element.

9. A device according to claim 8, characterized in that in the rotational speed/modulator additional means are available for the generation of sine and cosine signals at a natural multiple of the basic frequency, additional means are available to determine average values over time of the products of the mass flow and these sine and cosine signals respectively.

10. A device according to claim 8, characterized in that a divider element is available, the incremental transmitter is connected to this divider element, this divider element divides the frequency of a signal generated by the incremental transmitter by a suitable number, a phase corrector element is present, a processing element with two inputs is available, the divider element and the phase corrector element are connected each to one input of this processing element, the output of the processing element is connected to the rotational speed signal input of the rotational speed modulator, whereby the phase conditions of the angular functions generated by the angle function generator of the rotational speed modulator can be prescribed at will.

11. A device according to claim 10 characterized in that an integrated analog circuit element is applied in the device for the performance of at least one of the mathematical operations.

12. A device according to claim 10 characterized in that an integrated digital circuit element is applied in the device for the performance of at least one of the mathematical operations.

13. A device according to claim 10 characterized in that a digital computer is present and suitably connected with the device, this digital computer is applied in the device for the performance of at least one of the mathematical operations.

14. A device according to claim 2 characterized in that a divider element is present, the incremental transmitter is connected to this divider element, this divider element divides the frequency of a signal generated by the incremental transmitter by a suitable number, the incremental transmitter is connected indirectly via the divider element to the modulation detector.

15. A device according to claim 1, characterized in that the modulation detector includes:
   means with which the periodic deviations from the average value of the mass flow from a target value can be determined, and
   means for generating a signal characterized at least the periodic deviations having a frequenzy equal to the basic frequency.

16. A method for the operation of a device for controlling the dosing of the mass flow for a helical dosing equipment with a supply container for bulk material, an electric motor, an extraction helix coupled to the electric motor, a weighing machine which continuously measures the weight of the helical dosing equipment together with the remaining bulk material contained in the helical dosing equipment with a mass flow controller connected to an output of the weighing machine and a rotational speed regulator connected to the motor, characterised in that
   the periodic deviations of the mass flow from a target value are continuously analyzed by a modulation detector,
   an approximation function is calculated for these deviations,
   the rotational speed of the extraction helix, corresponding to the calculated approximation function, is modulated using a rotational speed modulator such that the deviations of the mass flow are reduced to the unavoidable random deviations and the periodic deviations of the mass flow are eliminated.

17. A method according to claim 16 characterized in that
   the mass flow is continuously determined using a sampling frequency, which is large compared to the basic frequency,
   the coefficients of at least the basic frequency in the Fourier series of the mass flow are determined,
   these coefficients are intermittently calculated and from them an approximation function for the time dependent deviation of the mass flow from an average value is calculated,
   the speed of rotation of the extraction helix is modulated in accordance with this approximation function.

18. A method in accordance with claim 12 characterized in that for the determination of the approximation function for the time dependent deviation of the mass flow from its target value the extreme values of the deviation of the mass flow are used.

19. A method in accordance with claim 18 characterized in that for the approximation function an overlay of at the most quadratic functions is used.

20. A method in accordance with claim 16 characterized in that
   the periodic deviations of the mass flow from a target value with the basic frequency are continuously analyzed using a modulation detector,
   an approximation function is calculated for these deviations,
   at suitable intervals of time a calibration measurement is performed over at least a period,
   amplitudes of the periodic deviations of the mass flow from its target value with a higher frequency than the basic frequency are determined from these calibration measurements,
   the speed of rotation of the extraction helix corresponding to a combination of the calculated approximation function for the basic frequency and the amplitudes of the deviations of higher frequency is modulated by a rotational speed modulator, so that the variations of the mass flow are reduced to the unavoidable random variations and the periodic deviations of the mass flow are eliminated.

21. Bulk material feeding apparatus comprising:
   a container for storing bulk material;
   a feeder for receiving bulk material from said container and for delivering bulk material to utilization equipment;
   a motor for driving said feeder to deliver metered amounts of the bulk material to the utilization equipment;
   a sensor unit for developing a position signal representative of the position of said feeder;
   a mass flow rate measuring unit for developing a mass flow rate signal representative of the actual mass flow rate of the bulk material delivered by said feeder to the utilization equipment;
   a target flow rate unit for setting a desired flow rate of the bulk material delivered to the utilization equipment;
   a mass flow controller responsive to said mass flow rate measuring unit and said target flow rate unit for developing a characteristic signal representative of the difference between the desired flow rate of the bulk material delivered to the utilization equipment and the actual mass flow rate of the bulk material delivered to the utilization unit;
   a modulation detector responsive to said mass flow controller and said sensor unit for quantitatively analyzing periodic deviations of a the actual mass flow rate of the bulk material delivered to the utilization equipment from the desired flow rate of the bulk material delivered to the utilization equipment;
   rotational speed modulator means responsive to said sensor unit and said modulation detector for generating a modulation signal representative of the quantitative analysis by said modulation detector;
   means responsive to said rotational speed modulator and said mass flow controller for processing the modulation signal and the characteristic signal into a modulated position signal; and
   a rotational speed regulator means responsive to the modulated position signal for controlling said motor to modulate the speed of said motor with the modulated position signal.

22. Bulk material feeding apparatus according to claim 21 wherein said mass flow rate measuring unit includes:
   (a) a scale for continuously measuring the weight of said container, said feeder, and the bulk material stored in said container, and
   (b) a differentiating circuit responsive to said scale for developing the mass flow rate signal.

23. Bulk material feeding apparatus according to claim 22 wherein said sensor unit develops a position signal composed of pulses and representative of the angular position of said feeder.

24. Bulk material feeding apparatus according to claim 23 wherein the frequency of the pulses of the position signal is dependent on the rotational speed of said motor and said modulation detector includes:
   (a) means for determining periodic deviations of the average value of the mass flow rate of the bulk material delivered to the utilization equipment from desired flow rate of the bulk material delivered to the utilization equipment, (b) means for generating a sine signal and a cosine signal, each having a basic frequency defined by the number of pulses of the position signal divided by the number of pulses developed during a single revolution of said motor, (c) a first multiplication means for multiplying the mass flow rate signal with the sine signal, (d) a second multiplication means for multiplying the mass flow rate signal with the cosine signal, (e) a first integration means for developing an average value over time of the mass flow rate signal multiplied with the sine signal, and (f) a second integration means for developing an average value over time of the mass flow rate signal multiplied with the cosine signal.

25. Bulk material feeding apparatus according to claim 23 wherein said rotational speed modulator includes:

(a) means for generating a sine signal and a cosine signal, each having a basic frequency defined by the number of pulses of the position signal divided by the number of pulses developed during a single revolution of said motor, (b) a first multiplication means for multiplying an output of said modulation detector with the sine signal, (c) a second multiplication means for multiplying an output of said modulation detector with the cosine signal, and (d) means for adding the product of the output of said modulation detector and the sine signal and the product of the output of said modulation detector and the cosine signal to develop the modulation signal.

26. Bulk material feeding apparatus according to claim 23 wherein the frequency of the pulses of the position signal is dependent on the rotational speed of said motor and:

(a) said modulation detector includes:

(1) means for determining periodic deviations of the average value of the mass flow rate of the bulk material delivered to the utilization equipment from desired flow rate of the bulk material delivered to the utilization equipment, (2) means for generating a sine signal and a cosine signal, each having a basic frequency defined by the number of pulses of the position signal divided by the number of pulses developed during a single revolution of said motor, (3) a first multiplication means for multiplying the mass flow rate signal with the sine signal of said modulation detector, (4) a second multiplication means for multiplying the mass flow rate signal with the cosine signal of said modulation detector, (5) a first integration means for developing an average value over time of the mass flow rate signal multiplied with the sine signal of said modulation detector, and (6) a second integration means for developing an average value over time of the mass flow rate signal multiplied with the cosine signal of said modulation detector, and (b) said rotational speed modulator includes:

(1) means for generating a sine signal and a cosine signal, each having a basic frequency defined by the number of pulses of the position signal divided by the number of pulses developed during a single revolution of said motor, (2) a first multiplication means for multiplying an output of said modulation detector with the sine signal of said rotational speed modulator, (3) a second multiplication means for multiplying an output of said modulation detector with the cosine signal of said rotational speed modulator, and (4) means for adding the product of the output of said modulation detector and the sine signal of said rotational speed modulator and the product of the output of said modulation detector and the cosine signal of said rotational speed modulator to develop the modulation signal.

27. Bulk material feeding apparatus according to claim 23 wherein said modulation detector includes:

(a) means for determining periodic deviations of the average value of the mass flow rate of the bulk material delivered to the utilization equipment from the desired flow rate of the bulk material delivered to the utilization equipment, and (b) means for developing an indication of the periodic deviations of the average value of the mass flow rate of the bulk material delivered to the utilization equipment from the desired flow rate of the bulk material delivered to the utilization equipment.

28. Bulk material feeding apparatus according to claim 27 wherein the indication is a signal having a basic frequency defined by the number of pulses of the position signal divided by the number of pules developed during a single revolution of said motor.

29. Bulk material feeding apparatus according to claim 24 wherein said modulation detector includes:

(a) means for determining periodic deviations of the average value of the mass flow rate of the bulk material delivered to the utilization equipment from the desired flow rate of the bulk material delivered to the utilization equipment, and (b) means for developing a rotational speed modulator signal representative of the periodic deviations of the average value of the mass flow rate of the bulk material delivered to the utilization equipment from the desired flow rate of the bulk material delivered to the utilization equipment and for supplying the rotational speed modulator signal to said rotational speed modulator.

* * * * *

UNITED STATES PATENT AND TRADEMARK OFFICE
CERTIFICATE OF CORRECTION

PATENT NO. : 6,702,152 B1
DATED : March 9, 2004
INVENTOR(S) : Stefan Ludescher

It is certified that error appears in the above-identified patent and that said Letters Patent is hereby corrected as shown below:

Title page,
Item [86], Filing Date, under "§ 371 (c)(1),(2),(4)," delete "February 23, 2002" insert -- April 23, 2002 --.

Column 3,
Line 47, delete the first and second occurrence of "smod(t)" and insert -- $s_{mod}(t)$ --.

Column 4,
Line 25, delete "$\dot{m}t(t)$" and insert -- $\dot{m}(t)$ --.

Column 5,
Line 8, delete "$C1 = \frac{1}{T}\int_0^T m(t) \cdot \cos(2\pi f \cdot t) dt$" and insert -- $C1 = \frac{1}{T}\int_0^T \dot{m}(t) \cdot \cos(2\pi f \cdot t) dt$ --.

Column 9,
Line 43, delete "12" and insert -- 17 --.

Signed and Sealed this

Fifteenth Day of February, 2005

JON W. DUDAS
*Director of the United States Patent and Trademark Office*